C. F. RUBSAM.
VEHICLE WHEEL.
APPLICATION FILED MAR. 9, 1918. RENEWED MAR. 19, 1921.
1,395,362. Patented Nov. 1, 1921.
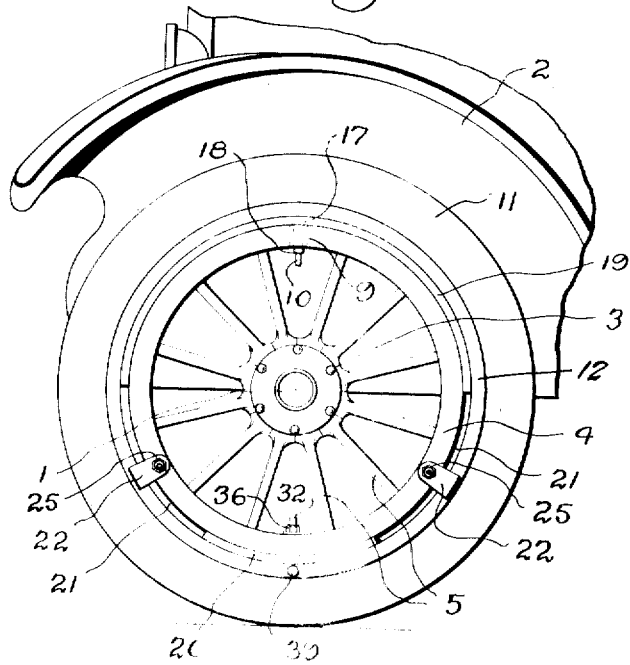
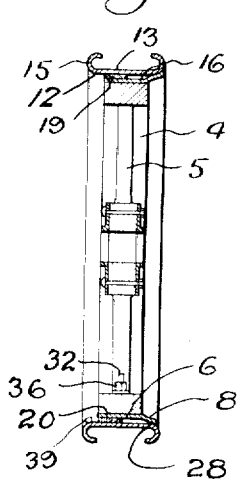
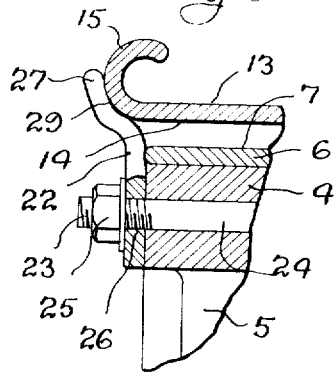
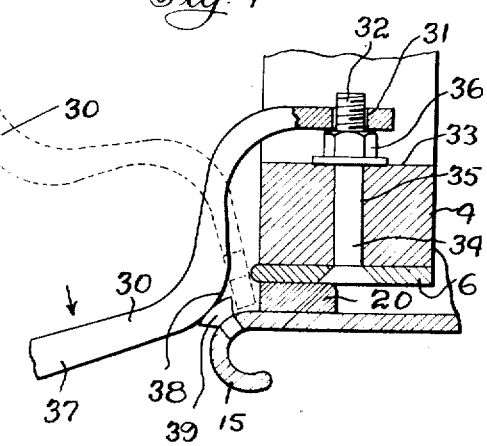
Charles F. Rubsam, Inventor
By his Attorneys
Emery, Booth, Janney & Varney

UNITED STATES PATENT OFFICE.

CHARLES F. RUBSAM, OF CLEVELAND, OHIO.

VEHICLE-WHEEL.

1,395,362. Specification of Letters Patent. Patented Nov. 1, 1921.

Application filed March 9, 1918, Serial No. 221,431. Renewed March 19, 1921. Serial No. 453,718.

*To all whom it may concern:*

Be it known that I, CHARLES FERDINAND RUBSAM, a citizen of the Republic of France, and a resident of Cleveland, in the county of Cuyahoga and State of Ohio, have invented an Improvement in Vehicle-Wheels, of which the following is a specification.

My invention relates to vehicle wheels, and particularly to those types of wheel which are provided with removable or detachable tire-carrying rims. The object of my invention is to provide wheels of the general character indicated which shall be simple in construction and efficient in operation.

By way of example I have illustrated a preferred embodiment of my invention in the accompanying drawings, wherein:

Figure 1 is a side-elevational view of such embodiment;

Fig. 2 is a cross-sectional view of the same with the rim in position on the wheel body;

Fig. 3 is a detail view, partly in elevation and partly in cross-section, showing a portion of the rim, wheel body, and associated bracing members;

Fig. 4 is a cross-sectional view showing a tool which may be used for applying the rim to the wheel body or for removing the former from the latter.

Referring to the illustrative embodiment herein shown and described by way of example merely, 1 indicates the axle of a vehicle 2, such as an automobile or the like, said axle carrying in the usual manner a wheel body 3 consisting, for example, of a felly 4, spokes 5, and a felly band 6 attached to the outer face of the felly 4. The felly band 6 is provided with a substantially cylindrical surface 7 and a flange portion 8. The felly is provided in the usual manner with a radial aperture 9 for permitting the passage of a tire valve 10 of a tire 11 therethrough.

Coöperating with the wheel body 3 is a removable or detachable rim 12 comprising, preferably, a rim band 13 providing on the inner surface thereof a substantially cylindrical surface 14 and being preferably provided with the upturned flanged members 15 and 16 respectively for retaining the tire 11 in place on the rim. The rim band 13 is provided in the usual manner with an aperture 17 for permitting the passage of the tire valve 10 therethrough, said aperture 17 being preferably, though not necessarily, provided with a reinforcing thimble 18.

In its preferred form, the vehicle wheel of my invention is provided with a plurality of coöperating, substantially cylindrical bearing surfaces, so proportioned that the rim will be adapted to have a tight fit on the wheel body when in position thereon. Preferably the coöperating, substantially cylindrical bearing surfaces are so disposed that one or more portions of the opposed faces of the wheel body and rim, when the rim is in position on the wheel body, will be substantially out of contact with each other, with the result that the rim will be more or less flexed adjacent the non-contacting portions of the rim and wheel body to cause the rim to accommodate itself to wheel bodies of slightly varying dimensions. This result I attain by providing the rim and wheel body with a plurality of coöperating, preferably substantially cylindrical bearing surfaces, as, for example, by providing the rim, or wheel body, or both, with one or more cylindrical bearing members. Preferably I provide substantially cylindrical bearing surfaces in the form of raised, discontinuous bearing portions which may be either stamped out of the rim band, or the felly band, or both, as the case may be, or, preferably, as illustrated, by providing segmental cylindrical bearing bands, such as the bands 19 and 20 respectively. While I have stated that the rim at certain portions thereof will be substantially out of contact with the wheel body, it will be understood that by properly proportioning the various parts of the vehicle wheel, sufficient flexing of the rim may take place to bring the same into supporting, but not binding, contact with the wheel body.

Where a plurality of raised, substantially cylindrical bearing surfaces or bands are employed, I may, as already stated, position all of said surfaces on the wheel body alone, or on the rim alone, or some on the rim and some on the wheel body. Such surfaces may also be disposed along the rim, or along the wheel body, or both, toward the vehicle side of the wheel, or toward the outer side of the wheel, or some may be to one side and some to the other side of the wheel body. Preferably I employ the arrangement illustrated herein by way of example, wherein the raised bearing surface, such as 19 for example, is applied to the wheel body, adjacent the outer portion of the wheel body, while another raised substantially cylindrical bearing surface, such as 20, is formed adjacent the outer portion of the wheel body but is preferably applied to the rim.

The various parts are so proportioned that the external diameter of the wheel body to a point thereof corresponding to a raised cylindrical bearing surface, such as 19, is substantially greater than the corresponding internal diameter of said rim, while said body at another point thereof, not on a raised bearing surface, has an external diameter substantially less than the corresponding internal diameter of said rim. Accordingly, when the rim is in position on the wheel body, there will be one or more portions or "bridges" where the rim will not be substantially in contact with the wheel body, or at least where, if there is such contact, it will be a light, supporting contact rather than a heavy binding contact such as exists at the meeting areas of the raised coöperating, substantially cylindrical bearing surfaces of the rim and wheel body. In the preferred embodiment illustrated, the raised bearing surface 19 may be approximately 180° in extent, more or less, and the same may, if desired, be in sections, that is, divided into a plurality of arcs preferably not extending through substantially more than 180° of the external circumference of the wheel body. The raised substantially cylindrical bearing surface 20 is sufficiently less than 180° in extent to provide one or more bridges or gaps 21, 21, where flexing of the rim when in position on the wheel body may take place.

The preferred form of vehicle wheel herein illustrated by way of example, may be assembled as follows: The rim is applied to the felly by inserting the tire valve 10, preferably reinforced by the thimble 18 attached to the rim band 13, through the radial aperture 9 of the wheel body 3. The rim carrying the tire is now swung or pivoted about one or more portions of the wheel body, here shown as one portion of such wheel body, until the raised bearing surface 20 binds against the outer portion of the felly band 6 of the wheel body 3. This binding is due to the fact that the dimensions of the various parts of the wheel, as already stated, are such that the external diameter of the wheel body at a point corresponding, say for example, to the aperture 9, is substantially greater than the corresponding internal diameter of the rim and also because the rim is presented at an angle to the wheel body as it is applied. Accordingly, the rim must be forced into position on the wheel body by any suitable means, this action resulting in the rim accommodating itself to the wheel body. This latter result is attained by providing the spaced or "bridge" portions 21, 21, where no raised bearing surfaces are provided so that the rim, when in position on the wheel body, will either be out of contact with the latter or else there will be a light supporting, but not binding, contact between the rim and the wheel body, the rim being "flexed" or flattened adjacent such portions 21, 21.

It is of course to be understood that either of the raised surfaces 19 and 20, or both of them, may be removable, and that where, for example, the raised bearing surface 20 is removable, the same may be inserted in position between the rim and the wheel body after the rim has been applied to the wheel body, the removable cylindrical bearing surface 20 being then forced in to bring about the flexing of the rim adjacent portions 21, 21 as already described for the case where the raised cylindrical bearing surface 20 is fixed to the rim.

In order to more securely position the rim on the wheel body, and in order also to reinforce and properly distribute the tension adjacent portions 21, 21, due to the flexing of the rim adjacent such portions, I may employ one or more members 22 which may be removably held in position on the threaded ends 23 of bolts 24 by means of nuts 25, the member 22 being apertured at 26 and being provided with an extension 27 which bears against flanged portion 15 of the rim band 13. The members 22 by bracing the rim adjacent the flexed portions of the same serve to take up some of the stresses on the rim at such portions to thereby increase the pressure of contact at the contacting portions of the rim and wheel body, and to create a substantially uniform space between the rim and the wheel body all around the circumference of the rim and the wheel body as clearly shown in Fig. 1 of the drawings.

It will be apparent that not only is there provided a plurality of coöperating substantially cylindrical bearing surfaces between the rim and wheel body, corresponding to the outer substantially cylindrical surfaces of the raised bearing portions 19 and 20, but also, due to the provision of flange 8, there will be a continuous bearing or support between such flange 8 and the corresponding portion of the flange 16 of the rim, as indicated by reference character 28, along the whole inner circumference of the rim band 13 and the felly band 6. The member or members 22 also provide bearings as indicated by the reference character 29. It is of course to be understood that where the raised bearing surfaces 19 and 20 are only a small fraction of an inch in height, flexing of the rim adjacent portions 21, 21, may bring said rim into slight supporting contact with the wheel body, in which case there is even less need for the members 22, so that the same may be altogether dispensed with. The provision of the raised bearing surfaces provides the rim, as well as the wheel body, with a plurality, at least two in number, of discontinuous substantially cylindrical bearing surfaces coöperating as already described.

For the purpose of assisting in the application of the rim to and its removal from the wheel body, I may employ a tool such as the lever 30 which is apertured as at 31 to engage a projection 32 on the inner surface 33 of the felly 4. This projection 32 may comprise the threaded end of a bolt 34 held in the radial aperture 35 of the felly 4 by means of a nut 36. The lever 30 has the handle or operating portion 37 and the protruding or projecting portion 38 which coöperates with the rim, as by engaging a projection 39 on said rim, to force the latter into position on the wheel body. The tool 30 is shown in dotted lines in position to remove the rim from the wheel body.

It is of course to be understood that my invention is not to be limited to the specific embodiment herein shown and described by way of example merely.

What I claim is:

1. A vehicle wheel comprising a wheel body having a flange, a removable rim for said wheel body and means associated with said rim and wheel body for permitting the former to be swung into position on the latter about a portion of the wheel body as a pivot, said means comprising a plurality of raised bearing members interposed between said rim and wheel body, said bearing members being spaced from each other, certain of said bearing members being included entirely within one and the remainder of said bearing members being included entirely within the other of two complementary arcs of about 180° each, one of said arcs including that portion of the wheel body about which the rim is swung.

2. A vehicle wheel comprising a wheel body having a flange, a removable rim for said wheel body, means associated with said rim and wheel body for permitting the former to be swung into position on the latter about a portion of the wheel body as a pivot, said means comprising a plurality of raised segmental bearing members interposed between said rim and wheel body, said bearing members being spaced from each other, certain of said bearing members being included entirely within one and the remainder of said bearing members being included entirely within the other of two complementary arcs of about 180° each, one of said arcs including that portion of the wheel body about which the rim is swung, and means for holding said rim against said flange on said wheel body.

3. A vehicle wheel comprising a wheel body having a flange, a removable rim for said wheel body, means associated with said rim and said wheel body for permitting the former to be swung into position on the latter about a portion of the wheel body as a pivot, said means comprising a plurality of raised segmental bearing members interposed between said rim and said wheel body, said bearing members being spaced from each other, certain of said bearing members being included entirely within one and the remainder of said bearing members being included entirely within the other of two complementary arcs of about 180° each, one of said arcs including that portion of the wheel body about which the rim is swung as a pivot, and clamping means intermediate certain of said spaced bearing members for clamping the rim against the flange on the wheel body.

4. A vehicle wheel comprising a wheel body having a flange, a removable rim for said wheel body, means associated with said rim and said wheel body for permitting the former to be swung into position on the latter about a portion of the wheel body as a pivot, said means comprising a plurality of raised segmental bearing members interposed between said rim and said wheel body, said bearing members being spaced from each other, certain of said bearing members being included entirely within one and the remainder of said bearing members being included entirely within the other of two complementary arcs of about 180° each, one of said arcs including that portion of the wheel body about which the rim is swung as a pivot, the bearing members on both of said arcs being on that side of the wheel which is remote from the vehicle, and clamping means intermediate certain of said spaced bearing members for clamping the rim against the flange on the wheel body.

5. A vehicle wheel comprising a wheel body having a flange, a removable rim for said wheel body, means associated with said rim and said wheel body for permitting the former to be swung into position on the latter about a portion of the wheel body as a pivot, said means comprising a plurality of raised substantially cylindrical segmental bearing members interposed between said rim and said wheel body, said bearing members being spaced from each other, certain of said bearing members being included entirely within one and the remainder of said bearing members being included entirely within the other of two complementary arcs of about 180° each, one of said arcs including that portion of the wheel body about which the rim is swung as a pivot, and clamping means intermediate certain of said spaced bearing members for clamping the rim against the flange on the wheel body.

6. A vehicle wheel comprising a wheel body having a flange, a removable rim for said wheel body, means associated with said rim and said wheel body for permitting the former to be swung into position on the latter about a portion of the wheel body as a pivot, said means comprising a plurality of raised substantially cylindrical segmental bearing members interposed between said rim and said wheel body, said bearing members being spaced from each other, certain of said bearing members being included entirely within one and the remainder of said bearing members being included entirely within the other of two complementary arcs of about 180° each, one of said arcs including that portion of the wheel body about which the rim is swung as a pivot, the bearing members on both of said arcs being on that side of the wheel which is remote from the vehicle, and clamping means intermediate certain of said spaced bearing members for clamping the rim against the flange on the wheel body.

In testimony whereof, I have signed my name to this specification this 7th day of March, 1918.

CHARLES F. RUBSAM.

DISCLAIMER.

1,395,362.—*Charles F. Rubsam*, Cleveland, Ohio. VEHICLE WHEEL. Patent dated November 1, 1921. Disclaimer filed August 23, 1928, by the assignee, *Rubsam Corporation*.

Hereby enters this disclaimer, to wit:

(1) To the combination of claim 1, except where in such combination, there are circumferentially-extending clearances or spaces between the rim and the wheel body at the points necessary to permit the inner side of the rim to clear the outer side of the wheel body when the rim is swung transversely onto the wheel body and to permit the rim, when it has been placed on the body, to be concentrically spaced around the body, by the bearing members.

(2) To the combination of claim 2, except where in such combination, there are circumferentially-extending clearances or spaces between the rim and the wheel body at the points necessary to permit the inner side of the rim to clear the outer side of the wheel body when the rim is swung transversely onto the wheel body and to permit the rim, when it has been placed on the body, to be concentrically spaced around the body, by the bearing members.

(3) To the combination of claim 3, except where in such combination, there are circumferentially-extending clearances or spaces between the rim and the wheel body at the points necessary to permit the inner side of the rim to clear the outer side of the wheel body when the rim is swung transversely onto the wheel body and to permit the rim, when it has been placed on the body, to be concentrically spaced around the body, by the bearing members.

(4) To the combination of claim 4, except where in such combination, there are circumferentially-extending clearances or spaces between the rim and the wheel body at the points necessary to permit the inner side of the rim to clear the outer side of the wheel body when the rim is swung transversely onto the wheel body and to permit the rim, when it has been placed on the body, to be concentrically spaced around the body, by the bearing members.

(5) To the combination of claim 5, except where in such combination, there are circumferentially-extending clearances or spaces between the rim and the wheel body at the points necessary to permit the inner side of the rim to clear the outer side of the wheel body when the rim is swung transversely onto the wheel body and to permit the rim, when it has been placed on the body, to be concentrically spaced around the body, by the bearing members.

(6) To the combination of claim 6, except where in such combination, there are circumferentially-extending clearances or spaces between the rim and the wheel body at the points necessary to permit the inner side of the rim to clear the outer side of the wheel body when the rim is swung transversely onto the wheel body and to permit the rim, when it has been placed on the body, to be concentrically spaced around the body, by the bearing members.

[*Official Gazette September 25, 1928.*]